United States Patent
Smith et al.

(10) Patent No.: US 6,388,773 B1
(45) Date of Patent: May 14, 2002

(54) SIMULTANEOUS MULTI-MODE CAPTURE BUTTON BEHAVIOR

(75) Inventors: Kevin N. Smith, Ft. Collins; Dan L. Dalton, Greeley; Andrew C. Goris, Loveland, all of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/256,789

(22) Filed: Feb. 24, 1999

(51) Int. Cl.$^7$ .............................................. H04N 1/024
(52) U.S. Cl. ....................................................... 358/473
(58) Field of Search .................................. 358/473, 472, 358/474, 486, 488, 471; 382/313, 312; 250/208.1, 557

(56) References Cited

U.S. PATENT DOCUMENTS 5,278,673 A * 1/1994 Scapa .......................... 358/473
5,825,044 A    10/1998 Allen et al. ................... 250/557

OTHER PUBLICATIONS

U.S. Patent application, Ser. No: 09/130,573, Filing Date: Aug. 07, 1998, Title: Appliance and Method of Using Same For Capturing Images.

* cited by examiner

Primary Examiner—Cheukfan Lee

(57) ABSTRACT

An ergonomic "press-on-press-off" capture mode is added to an existing "press-and-hold" capture mode in a portable hand-held scanning device without adding additional control buttons or requiring the user to make a selection between which capture mode to use. Supporting both capture modes simultaneously is accomplished through monitoring the capture button and distance traveled by the device. When the capture button is pressed and released, a check is made to see if the device was moved a predetermined distance while the capture button was depressed. If yes, then the press-and-hold capture mode is confirmed, and image data capture ends. If no, then the press-on-press-off capture mode is confirmed, and image data capture continues, even though the capture button is not depressed, until a second press of the capture button or lift off. The second press of the capture button or lift off terminates the image data capture for the press-on-press-off capture mode.

32 Claims, 3 Drawing Sheets

SIMULTANEOUS MULTI-MODE CAPTURE BUTTON BEHAVIOR

CROSS REFERENCE TO RELATED APPLICATIONS

This application is related to application Ser. No. 09/130,573 filed Aug. 7, 1998 entitled Appliance and Method of Using Same for Capturing Images, and to U.S. Pat. No. 5,825,044 issued on Oct. 20, 1998 to Allen. et al.

TECHNICAL FIELD

This invention relates to capture devices and more particularly to hand-held scanning devices. Even more particularly, the invention relates to capturing an image with a hand-held scanning device utilizing a simultaneous multi-mode capture button.

BACKGROUND OF THE INVENTION

Portable hand-held scanning devices have proven to be very useful tools. Being able to capture a document virtually anywhere at anytime is convenient, increases productivity, and saves time. The ergonomics of utilizing hand-held scanning devices has, however, left much to be desired.

Most hand-held scanning devices require the user to hold the scanner at a fixed angle to the document when in the capture mode in order to keep the image pickup and navigation sensors in proper contact with the document. In addition, most hand-held scanning devices require the user to hold down a capture button when moving the scanner over the surface of a document in order to scan the document or desired portions of the document. This is referred to as a "press-and-hold" capture mode. Depending upon the circumstances, the user may also have to hold or steady the document being scanned with one hand, while trying to hold the hand-held scanning device and press down the capture button with the other hand, to scan the document.

Because of the design, use characteristics, and circumstances under which hand-held scanning devices are commonly used, many users complain of hand, wrist, and arm fatigue, especially users with small hands. In using the press-and-hold capture mode, users, especially those having small hands, have found that it is difficult to hold down the capture button while moving the hand-held scanning device over the surface of the document while maintaining the proper angle between the hand-held scanning device and the document to insure proper continuous contact. In addition to focusing on all of the above, the user also has to be aware of the portions of the document already traversed and the portions of the document yet to be traversed, especially if a meandering path is required to capture all of the desired portions of the document.

It is thus apparent that there is a need in the art for an improved method or apparatus which improves the ergonomics of the capture mode utilized in portable hand-held scanning devices. The present invention meets these and other needs in the art.

SUMMARY OF THE INVENTION

It is an aspect of the present invention to improve the ergonomics of utilizing the capture mode of a portable hand-held scanning device.

It is another aspect of the invention to eliminate the need to hold down a capture button when capturing a document in the capture mode with a portable hand-held scanning device.

Yet another aspect of the invention is to eliminate hand, wrist, and arm strain by allowing a user to use one hand, to change hands to the other hand, or to use both hands in capturing a document in the capture mode with a portable hand-held scanning device.

Still another aspect of the invention is to maintain the portable hand-held scanning device in the capture mode when movement stops momentarily while the user changes hands or adjusts the document being scanned.

A further aspect of the invention is to allow a new ergonomic capture mode to coexist with the current capture mode within a portable hand-held scanning device without requiring the user to select which capture mode to use or add additional control buttons.

The above and other aspects of the invention are accomplished in a portable hand-held scanning device that adds an ergonomic "press-on-press-off" capture mode to the existing press-and-hold capture mode without requiring the user to make a selection between which capture mode to use. This is accomplished with changes made to the firmware and not by adding additional control buttons.

To capture a document using the normal press-and-hold capture mode, a user would position the portable hand-held scanning device on the document, press and then hold down the capture button, and move the portable hand-held scanning device over the surface of the document. When all of the surface of the document that the user desires to capture has been traversed by the image pickup component of the portable hand-held scanning device, the user then releases the capture button. The image data collected while the capture button was depressed is processed, displayed, and stored in device memory by the portable hand-held scanning device.

To utilize the new ergonomic press-on-press-off capture mode, a user would position the portable hand-held scanning device on the document, press the capture button and release it, and then move the portable hand-held scanning device over the surface of the document. When all of the surface of the document that the user desires to capture has been traversed by the image pickup component of the portable hand-held scanning device, the user presses and releases the capture button again to indicate the end of the press-on-press-off capture mode. Alternatively, the user may just lift the portable hand-held scanning device off of the surface of the document to indicate the end of the press-on-press-off capture mode. The image data collected between the press-on and subsequent press-off of the capture button, or subsequent lifting of the portable hand-held scanning device off of the document, is processed, displayed, and stored in device memory by the portable hand-held scanning device.

Supporting both capture modes of operation simultaneously is accomplished through monitoring the capture button and the distance traveled by the portable hand-held scanning device. The portable hand-held scanning device monitors the capture button. When the capture button is pressed, the portable hand-held scanning device begins by assuming the press-and-hold capture mode. The portable hand-held scanning device is prepared to capture image data when the capture button is pressed down. As the user begins to move the portable hand-held scanning device along the page with the capture button pressed down, image data is captured by the image pickup component starting from the beginning position of the portable hand-held scanning device. When the capture button is released, a check is made to see if the portable hand-held scanning device was moved while the capture button was depressed. If the portable hand-held scanning device was moved more than a predetermined distance, then the press-and-hold capture mode is confirmed and the image data capture is finished. If the portable hand-held scanning device moved less than or equal to the predetermined distance, then the press-on-press-off capture mode is confirmed. The portable hand-held scanning device continues to capture image data even though the capture button is released. Image data is captured until the capture button is pressed again, or until the portable handheld scanning device is lifted off of the document, to terminate the press-on-press-off capture mode.

The press-on-press-off capture mode can be aborted early if there has been no movement of the portable hand-held scanning device for a minimum predetermined period of time. This feature is to prevent a user from beginning an image data capture and forgetting to finish it, or inadvertently pressing and releasing the capture button when no image data capture was intended. If a user has captured some image data in the press-on-press-off capture mode, and then stops moving the portable hand-held scanning device, after the predetermined period of time has elapsed, any image data captured prior to the cessation of movement is stored in device memory. The portable hand-held scanning device then powers down the image pickup component and navigation sensors. Leaving the portable hand-held scanning device in a capture mode indefinitely would very quickly drain the batteries. Also, if the user inadvertently presses and releases the capture button and there is no movement of the portable hand-held scanning device, after the minimum period of time has elapsed, the device will power down the image pickup component and navigation sensors.

DESCRIPTION OF THE DRAWINGS

The above and other aspects, features, and advantages of the invention will be better understood by reading the following more particular description of the invention, presented in conjunction with the following drawings, wherein.

BEST MODE FOR CARRYING OUT THE INVENTION

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
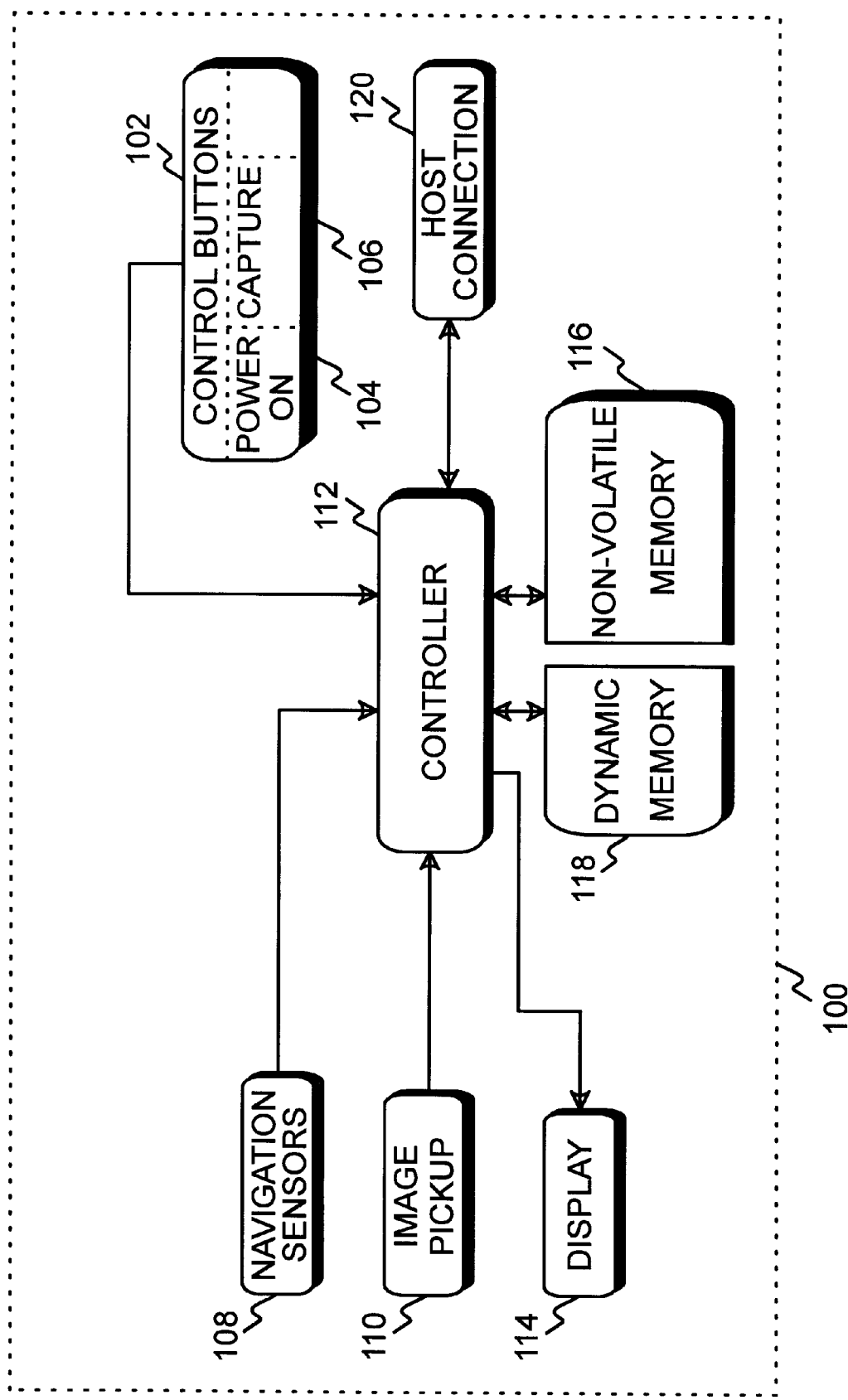
FIG. 1 shows a block diagram of a hand-held scanning device having the press-and-hold capture mode and the press-on-press-off capture mode of the present invention.

FIG. 1 shows a block diagram of a hand-held scanning device having the press-and-hold capture mode and the press-on-press-off capture mode of the present invention. Referring now to FIG. 1, capture device 100 is powered on by pressing power on button 104, which is one of several control buttons 102 on capture device 100. In the preferred embodiment of the invention, capture device 100 is a capture device as described in application Ser. No. 09/130,573 filed Aug. 7, 1998 entitled Appliance and Method of Using Same for Capturing Images, Docket No. 10980472, and as described in U.S. Pat. No. 5,825,044 issued on Oct. 20, 1998 to Allen. et al. Capture device 100 receives its power from internal batteries (not shown in FIG. 1), or alternatively through a power cable connected to capture device 100 and plugged into a power source (also not shown in FIG. 1).

To scan a document, capture device 100 is placed in a beginning position in close enough proximity to a document (not shown in FIG. 1) such that navigation sensors 108 and image pickup component 110 can function correctly within their operating parameters. Navigation sensors 108 and image pickup component 110 are connected to a controller 112. Normally, the document is placed on a smooth flat horizontal surface. Capture device 100 is placed in the beginning position in relation to the document such that navigation sensors 108 and image pickup component 110 are in proper proximity with the document, and oriented at the proper angle to the document, which is usually perpendicular, or at a slight angle from the perpendicular, to the document. Navigation sensors 108, which may be mechanical or optical, detect movement and gather movement data of capture device 100. Image pickup component 110 is usually a linear array of electrooptical sensor elements.

Image pickup component 110 optically reads sample points from the surface of the document and generates a grey scale value for each point sampled. Controller 112 receives the grey scale values for the sample points and assembles them into an image array. The image array may be output to di splay 114, which is connected to controller 112, showing a visual representation of the surface of the scanned document. Controller 112 may also convert the grey scale values to binary form for display or for storage. The image array, in either grey scale or binary form, is passed from controller 112 and stored as an image data file in non-volatile memory 116, which is connected to controller 112. Non-volatile memory 116 may also be a static memory. Image data files captured by capture device 100 may be copied to another device, such as a host computer system, through host connection 120, which is connected to controller 112.

To begin scanning in either capture mode, the user presses capture button 106, which is another one of the several control buttons 102. Other control buttons 102 are not shown in FIG. 1 for simplicity. Pressing capture button 106 sends a capture button down signal to controller 112. Controller 112 begins monitoring capture button 106 and navigation sensors 108 to determine the capture mode. The press-and-hold capture mode is assumed when capture button 106 is pressed, and image pickup component 110 begins capturing image data. When the user releases capture button 106, a capture button up signal is sent to controller 112. Upon receiving the capture button up signal, controller 112 evaluates the movement data captured by navigation sensors 108 to see if capture device 100 was moved while capture button 106 was depressed. If capture device 100 was moved more than a predetermined distance, then the press-and-hold capture mode is confirmed, and image data capture is complete. In the preferred embodiment of the invention, the predetermined distance is 0.25 inches. The image data that has been captured is processed by controller 112 for display on display 114. Capture device 100 may automatically store the image array as a data image file in non-volatile memory 116, or save the image array temporarily in dynamic memory 118, and then prompt the user to save the image array as an image data file in non-volatile memory 116 or delete the image array.

If controller 112 determines, upon receiving the capture button up signal, that capture device 100 was moved less than or equal to the predetermined distance, including no movement at all, then the press-on-press-off capture mode is confirmed. Image pickup component 110 continues to capture image data even though capture button 106 is no longer depressed. Image data capture is terminated when capture button 106 is pressed again, sending a capture button down signal to controller 112. Image data capture may also be terminated by controller 112 receiving a loss of proximity signal from navigation sensors 108 detecting that capture device 100 has been lifted off of the surface of document 202.

Prior to the second pressing of capture button 106 or the detecting by navigation sensors 108 that capture device 100 has been lifted off of document 202, if controller 112 detects no movement of capture device 100 for a predetermined period of time, then further image data capture is aborted. This is to prevent a user from beginning an image data capture and forgetting to finish the image data capture. Leaving capture device 100 powered on in the capture mode would quickly drain the batteries. In the preferred embodiment of the invention, the predetermined period of time is three seconds. When no movement is detected after the predetermined time has run out, the image data captured prior to the cessation of movement is stored in non-volatile memory 116, and capture device 100 powers down image pickup component 110 and navigation sensors 108. This feature allows a user to stop, change hands, adjust the document, etc. and still maintain capture device 100 in the press-on-press-off capture mode as long as movement is resumed before the predetermined period of time runs out.

Figure 2:
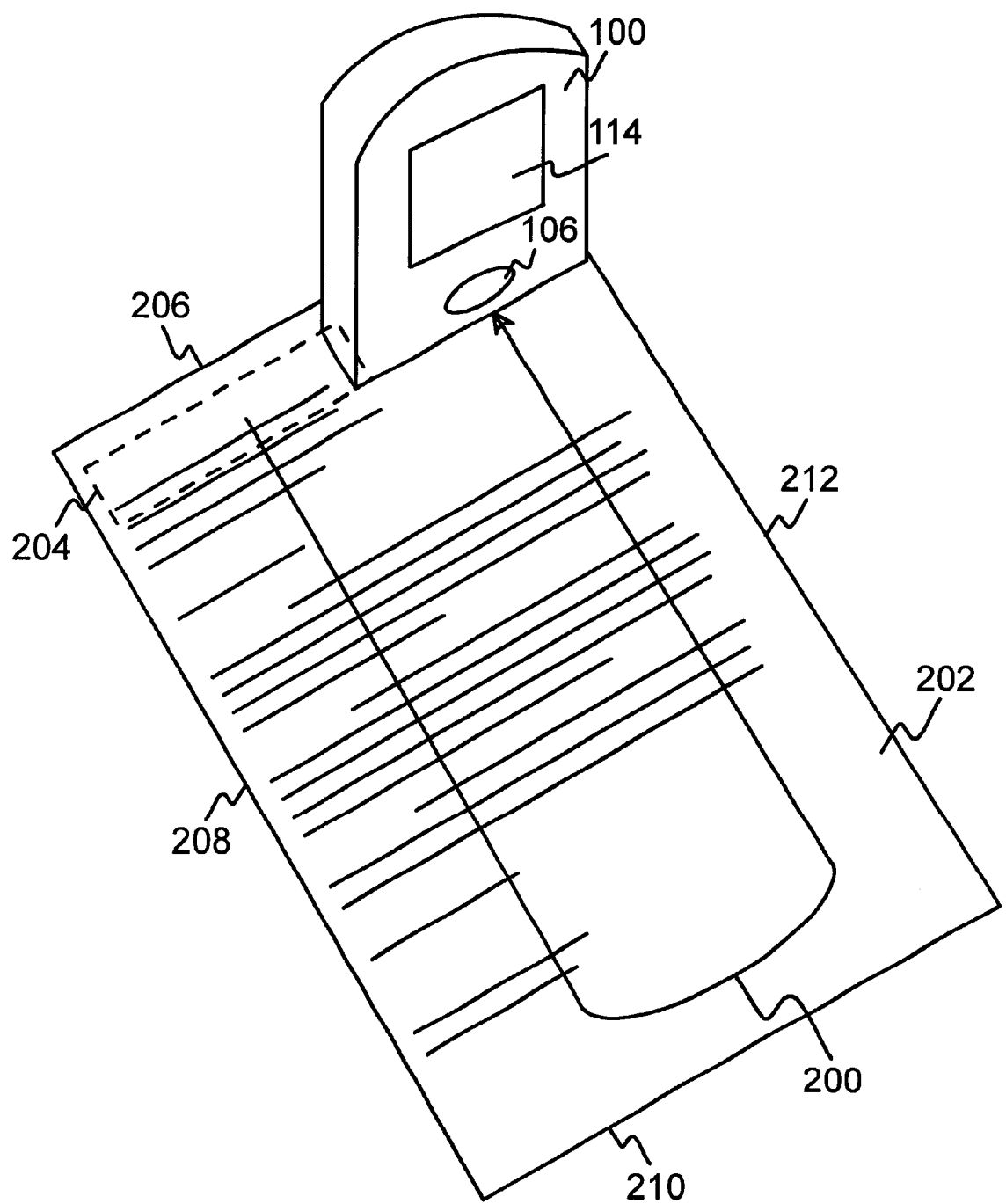
FIG. 2 shows a perspective view of a hand-held scanning device following a meandering path on a document, capturing swaths of image data, using the press-and-hold capture mode or the press-on-press-off capture mode of the present invention.

FIG. 2 shows a perspective view of a hand-held scanning device following a meandering path on the surface of a document to collect swaths of image data, using the press-and-hold capture mode, or the press-on-press-off capture mode of the present invention. Referring now to FIG. 2, capture device 100 (FIG. 1) is shown capturing swaths of image data by following a meandering path 200 over the surface of a document 202. Document 202 may be paper, cardboard, overhead transparency, or any other image bearing surface upon which capture device 100 may be successfully moved. Display 114 can display the results of a successful image data capture. Of the several control buttons 102 (FIG. 1), only capture button 106 is shown for simplicity.

To scan a document utilizing either capture mode, a user first places capture device 100 in a beginning position on document 202, such as that represented by starting location outline 204, which is adjacent to edge 206 and edge 208 of document 202, and oriented at the proper angle to document 202. Navigation sensors 108 and image pickup component 110 (not shown in FIG. 2), are located on the side of capture device 100 in proximate contact with document 202.

For the press-and-hold capture mode, the user would grasp capture device 100 with one or both hands such that capture button 106 can be depressed, normally by one or both thumbs or by one or more fingers. The press-and-hold capture mode is assumed as soon as capture button 106 is depressed. Capture button 106 must remain depressed while the user moves capture device 100 over the surface of document 202 capturing swaths of image data along meandering path 200. As shown in FIG. 2, capture device 100 begins in a corner of document 202, represented by starting location outline 204, adjacent to edge 206 and edge 208. The user then moves capture device 100, while maintaining capture button 106 in a depressed position, along edge 208 of document 202 to edge 210 along meandering path 200 capturing a first swath of image data. Next, the user then moves capture device 100 in a direction mostly perpendicular to the previous motion and along edge 210 of document 202 capturing a second swath of image data. Last, the user moves capture device 100 along edge 212 of document 202 to edge 206 completing meandering path 200, capturing a third swath of image data. The user then releases capture button 106. If movement greater than the predetermined minimum occurred while capture button 106 was depressed, which is the case in this example, the press-and-hold capture mode is confirmed. The multiple swaths of image data captured are processed by controller 112 (FIG. 1). Since there is an overlap of image data collected in the multiple swaths, a stitching algorithm during processing joins together the multiple swaths of image data captured. The resulting image array may be displayed on display 114 and stored in dynamic memory 118 or non-volatile memory 116.

For the press-on-press-off capture mode, with capture device 100 in the beginning position on document 202, represented by starting location outline 204, the user would depress capture button 106 and immediately release it while trying not move capture device 100 while capture button 106 is being depressed and released. Slight movements, less than or equal to the predetermined distance will be ignored, assuming the press-on-press-off capture mode. The user then grasps capture device 100, in whatever fashion is most comfortable, with one or both hands, and moves capture device 100 over the surface of document 202 along meandering path 200. As shown in FIG. 2, capture device 100 begins in a corner of document 202, represented by starting location outline 204, adjacent to edge 206 and edge 208. The user then moves capture device 100 along edge 208 of document 202 to edge 210 along meandering path 200 capturing a first swath of image data. Next, the user then moves capture device 100 in a direction mostly perpendicular to the previous motion and along edge 210 of document 202 capturing a second swath of image data. Last, the user moves capture device 100 along edge 212 of document 202 to edge 206 completing meandering path 200, capturing a third swath of image data. At any point along meandering path 200, the user may stop movement, change hands, adjust the position of document 202, or make any other adjustment or action without leaving the press-on-press-off capture mode, provided the cessation of movement is less than the predetermined period of time. This gives the user tremendous flexibility in capturing the image data and achieving comfortable ergonomic control over capture device 100.

With capture device 100 at the end of meandering path 200, the user then presses capture button 106 or lifts capture device 100 off of the surface of document 202, signaling the end of the press-on-press-off capture mode. The multiple swaths of image data captured are processed by controller 112 (FIG. 1). Since there is an overlap of image data collected in the multiple swaths, a stitching algorithm during processing joins together the multiple swaths of image data captured. The resulting image array may be displayed on display 114 and stored in dynamic memory 118 or non-volatile memory 116.

Figure 3:
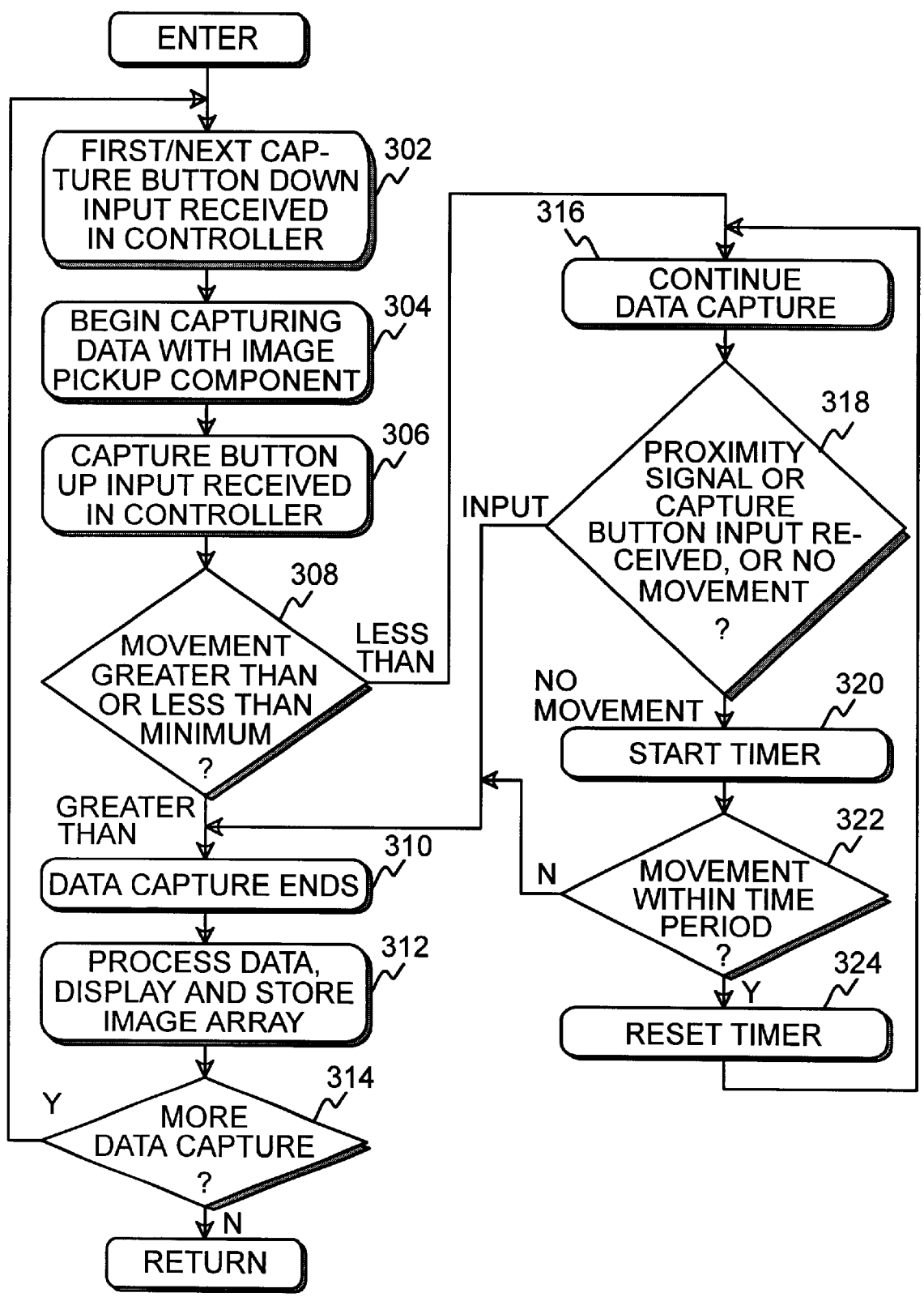
FIG. 3 shows a flowchart of the operation of the press-and-hold capture mode and the press-on-press-off capture mode of the present invention.

FIG. 3 shows a flowchart of the operation of the press-and-hold capture mode, and the press-on-press-off capture mode of the present invention. Referring now to FIG. 3, in step 302 capture button down input is received in controller 112 (FIG. 1). Controller 112 begins monitoring capture button 106 and navigation sensors 108 to determine the capture mode. Upon receiving the capture button down input, the press-and-hold capture mode is assumed, and in step 304 image pickup component 110 begins capturing image data from the beginning position of capture device 100.

In step 306 capture button up input is received in controller 112. In step 308 controller 112 determines wether capture device 100, through movement data captured by navigation sensors 108, has moved a distance that is greater than, or less than or equal to, a predetermined distance. In the preferred embodiment of the invention, the predetermined distance is 0.25 inches. If the determination in step 308 is that capture device 100 has moved more than 0.25 inches, then the press-and-ho Id capture mode is confirmed and control passes to step 310 where image data capture ends and image pickup component 110 and navigation sensors 108 are powered down. In step 312 controller 112 processes the values for the sample points read by image pickup component 110, and assembles them into an image array. The image array may be output to display 114, showing a visual representation of the surface of the scanned portion of document 202. The image array is passed from controller 112 and stored as an image data file in non-volatile memory 116 or dynamic memory 118. Step 314 determines if more image data is to be captured. If yes, control returns to step 302. If step 314 determines that no more image data is to be captured, then control returns to capture device 100 where other functions may be accessed by the user through control buttons 102.

If the determination in step 308 is that capture device 100 has moved less than or equal to the predetermined distance, including no movement at all, then control passes to step 316, where the press-on-press-off capture mode is confirmed and image pickup component 110 continues capturing image data. Step 318 determines if capture button down input is received in controller 112, or determines if a loss of proximity signal is received from navigation sensors 108, or determines if controller 112 determines that cessation of movement has occurred from movement data captured by navigation sensors 108. If capture button down input is received, or if a loss of proximity signal is received from navigation sensors 108, then control passes to step 310 where image data capture ends.

If the determination in step 318 is that cessation of movement has occurred, then in step 320 controller 112 starts a timer, which runs out a predetermined period of time. In the preferred embodiment of the invention, the predetermined period of time is three seconds. In step 322 controller 112 determines, from movement data captured by navigation sensors 108, if beginning of movement of capture device 100 occurs prior to the predetermined period of time running out. If beginning of movement occurs before the predetermined period of time runs out, then in step 324 controller 112 resets the timer to zero, and control returns to step 316 where image data capture continues.

If in step 322 controller 112 determines from movement data captured by navigation sensors 108 that no movement of capture device 100 occurred prior to the predetermined period of time running out, then control passes to step 310, where data capture ends.

Having thus described a presently preferred embodiment of the present invention, it will be understood by those skilled in the art that many changes in construction and circuitry and widely differing embodiments and applications of the invention will suggest themselves without departing from the scope of the present invention as defined in the claims. The disclosures and the description herein are intended to be illustrative and are not in any sense limiting of the invention, defined in scope by the following claims.

What is claimed is:

1. A method for capturing an image with a capture device, said method comprising:
    (a) receiving in a controller of said capture device, a first capture button down input from a capture button connected to said controller;
    (b) capturing a first portion of image data with an image pickup component connected to said controller;
    (c) receiving in said controller of said capture device, a first capture button up input from said capture button connected to said controller;
    (d) evaluating, by said controller, a first portion of movement data captured by at least one navigation sensor to determine a distance traveled by said capture device between said capture button down input and said capture button up input, wherein said at least one navigation sensor is connected to said controller;
    (e) when said distance is less than or equal to a predetermined distance, capturing a second portion of image data with said image pickup component connected to said controller;
    (f) receiving in said controller a second capture button down input from said capture button connected to said controller; and
    (g) processing said first portion of image data and said second portion of image data to generate an image array.

2. The method for capturing an image with a capture device according to claim 1 wherein said predetermined distance is 0.25 inches.

3. The method for capturing an image with a capture device according to claim 1 wherein step (e) further comprises the step (e1), and step (f) further comprises the step (f1):
    (e1) beginning a press-on-press-off capture mode before capturing said additional portion of image data with said image pickup component connected to said controller; and
    (f1) ending said press-on-press-off capture mode and powering down said image pickup component and powering down said at least one navigation sensor.

4. The method for capturing an image with a capture device according to claim 1 wherein step (f) is replaced by the following new step (f):
    (f) receiving in said controller a loss of proximity signal from said at least one navigation sensor connected to said controller.

5. The method for capturing an image with a capture device according to claim 1 wherein step (e) is replaced by the following new step (e), and steps (f) and (g) are eliminated.
    (e) when said distance is greater than a predetermined distance, processing said first portion of image data to generate an image array.

6. The method for capturing an image with a capture device according to claim 1 wherein step (e) further comprises the steps (e1) through (e5):
    (e1) evaluating, by said controller, a second portion of movement data captured by said at least one navigation sensor for determining a cessation of movement of said capture device;
    (e2) when said cessation of movement is detected by said controller, starting a timer by said controller, wherein said timer begins to run out a predetermined period of time;

(e3) evaluating, by said controller, a third portion of movement data captured by said at least one navigation sensor for determining a beginning of movement of said capture device;

(e4) when said beginning of movement occurs before said predetermined period of time has been run out by said timer, resetting said timer to zero; and (e5) repeating steps (e1) through (e4) for additional portions of movement data until said controller receives said second capture button down input from said capture button in step (f).

7. The method for capturing an image with a capture device according to claim 6 wherein said predetermined period of time is three seconds.

8. The method for capturing an image with a capture device according to claim 6 wherein step (e4) further comprises the step (e4a):

(e4a) when said beginning of movement does not occur before said predetermined period of time has been run out by said timer, not performing step (e5) and not performing step (f).

9. The method for capturing an image with a capture device according to claim 1 further comprising the steps of:

(h) displaying said image array on a display connected to said controller; and (i) storing said image array as an image data file in a memory connected to said controller.

10. The method for capturing an image with a capture device according to claim 9 further comprising the step of:

repeating steps (a) through (i) for capturing a next image with said capture device.

11. A method for capturing an image with a capture device, said method comprising:

(a) receiving in a controller of said capture device, a first capture button down input from a capture button connected to said controller;

(b) capturing a first portion of image data with an image pickup component connected to said controller;

(c) receiving in said controller of said capture device, a first capture button up input from said capture button connected to said controller;

(d) evaluating, by said controller, a first portion of movement data captured by at least one navigation sensor to determine a distance traveled by said capture device between said capture button down input and said capture button up input, wherein said at least one navigation sensor is connected to said controller;

(e) when said distance is less than or equal to a predetermined distance, performing steps (f) through (h) and not step (i), and when said distance is greater than said predetermined distance, performing step (i) and not performing steps (f) through (h);

(f) capturing a second portion of image data with said image pickup component connected to said controller;

(g) receiving in said controller a second capture button down input from said capture button connected to said controller;

(h) processing said first portion of image data and said second portion of image data to generate an image array; and (i) processing said first portion of image data to generate an image array.

12. The method for capturing an image with a capture device according to claim 11 wherein said predetermined distance is 0.25 inches.

13. The method for capturing an image with a capture device according to claim 11 wherein step (a) further comprises the step (a1), step (e) further comprises the step (e1), step (f) further comprises the step (f0) performed before step (f), and step (g) further comprises the step (g1):

(a1) beginning a press-and-hold capture mode;

(e1) when said distance is greater than said predetermined distance, ending said press-and-hold capture mode and powering down said image pickup component and powering down said at least one navigation sensor;

(f0) beginning a press-on-press-off capture mode; and (g1) ending said press-on-press-off capture mode and powering down said image pickup component and powering down said at least one navigation sensor.

14. The method for capturing an image with a capture device according to claim 11 wherein step (f) is replaced by the following new step (f):

(f) receiving in said controller a loss of proximity signal from said at least one navigation sensor connected to said controller.

15. The method for capturing an image with a capture device according to claim 11 wherein step (f) further comprises the steps (f1) through (f5):

(f1) evaluating, by said controller, a second portion of movement data captured by said at least one navigation sensor for determining a cessation of movement of said capture device;

(f2) when said cessation of movement is detected by said controller, starting a timer by said controller, wherein said timer begins to run out a predetermined period of time;

(f3) evaluating, by said controller, a third portion of movement data captured by said at least one navigation sensor for determining a beginning of movement of said capture device;

(f4) when said beginning of movement occurs before said predetermined period of time has been run out by said timer, resetting said timer to zero; and (f5) repeating steps (f1) through (f4) for additional portions of movement data until said controller receives said second capture button down input from said capture button in step (g).

16. The method for capturing an image with a capture device according to claim 15 wherein said predetermined period of time is three seconds.

17. The method for capturing an image with a capture device according to claim 15 wherein step (f4) further comprises the step (f4a):

(f4a) when said beginning of movement does not occur before said predetermined period of time has been run out by said timer, not performing step (f5) and not performing step (g).

18. The method for capturing an image with a capture device according to claim 11 further comprising the steps of:

(j) displaying said image array on a display connected to said controller; and (k) storing said image array as an image data file in a memory connected to said controller.

19. The method for capturing an image with a capture device according to claim 18 further comprising the step of:

(l) repeating steps (a) through (k) for capturing a next image with said capture device.

20. A capture device for capturing an image comprising:

an image pickup component for capturing a first portion of image data;

a capture button for sending a first capture button down input and sending a first capture button up input;

at least one navigation sensor for gathering a first portion of movement data between said first capture button down input and said first capture button up input; and a controller, connected to said image pickup component, connected to said at least one navigation sensor, and connected to said capture button, for receiving said first capture button down input, for receiving said first capture button up input, and for receiving said first portion of movement data, wherein said controller determines a distance traveled by said capture device from said first portion of movement data, and further wherein, when said distance is greater than a predetermined distance, said controller processes said first portion of image data to generate an image array, and when said distance is less than or equal to said predetermined distance, said image pickup component captures a second portion of image data, said controller receives a second capture button down input from said capture button, and said controller processes said first portion of image data and said second portion of image data to generate said image array.

21. The method for capturing an image with a capture device according to claim 20 wherein said predetermined distance is 0.25 inches.

22. The capture device for capturing an image according to claim 20 wherein a press-and-hold capture mode begins when said controller receives said first capture button down input from said capture button, and said press-and-hold capture mode ends when said controller determines that said distance is greater than said predetermined distance.

23. The method for capturing an image with a capture device according to claim 20 wherein when said image pickup component captures said second portion of image data, and said controller receives a loss of proximity signal from said at least one navigation sensor, said controller processes said first portion of image data and said second portion of image data to generate said image array.

24. The capture device for capturing an image according to claim 20 wherein a press-on-press-off capture mode begins when said controller determines that said distance is less than or equal to said predetermined distance, and said press-on-press-off capture mode ends when said controller receives said second capture button down input from said capture button.

25. The capture device for capturing an image according to claim 24 wherein, when said capture device is in said press-on-press-off capture mode, said controller evaluates a second portion of movement data captured by said at least one navigation sensor to determine a cessation of movement of said capture device, and further wherein, when said cessation of movement is detected, said controller starts a timer which begins to run out a predetermined period of time, and said controller evaluates a third portion of movement data captured by said at least one navigation sensor to determine a beginning of movement of said capture device.

26. The method for capturing an image with a capture device according to claim 25 wherein said predetermined period of time is three seconds.

27. The capture device for capturing an image according to claim 25 wherein when said beginning of movement occurs before said predetermined period of time has been run out by said timer, said controller resets said timer to zero.

28. The capture device for capturing an image according to claim 25 wherein when said beginning of movement does not occur before said predetermined period of time has been run out by said timer, said controller powers down said image pickup component, powers down said at least one navigation sensor, and processes said first portion of image data and said second portion of image data to generate said image array.

29. The method for capturing an image with a capture device according to claim 28 wherein said memory is a non-volatile memory.

30. The capture device for capturing an image according to claim 20 further comprising:

a display connected to said controller for displaying said image array; and a memory connected to said controller for storing said image array as an image data file.

31. The method for capturing an image with a capture device according to claim 30 wherein said memory is a dynamic memory.

32. The capture device for capturing an image according to claim 20 further comprising:

a host connection connected to said controller for transferring said image data file to a host computer.

* * * * *